United States Patent [19]
Tonar

[11] Patent Number: 5,790,298
[45] Date of Patent: Aug. 4, 1998

[54] METHOD OF FORMING OPTICALLY TRANSPARENT SEAL AND SEAL FORMED BY SAID METHOD

[75] Inventor: William L. Tonar, Park Township, Ottawa County, Mich.

[73] Assignee: Gentex Corporation, Zeeland, Mich.

[21] Appl. No.: 780,107

[22] Filed: Dec. 26, 1996

Related U.S. Application Data

[63] Continuation of Ser. No. 560,004, Nov. 17, 1995, abandoned, which is a continuation-in-part of Ser. No. 237,604, May 3, 1994, abandoned.

[51] Int. Cl.$^6$ .................................................. G02F 1/15
[52] U.S. Cl. .................. 359/267; 359/265; 359/272; 359/274; 359/513
[58] Field of Search ......................... 359/265, 267, 359/269, 270, 272, 274, 275, 513

[56] References Cited

U.S. PATENT DOCUMENTS

| | | | |
|---|---|---|---|
| 4,227,779 | 10/1980 | Bissar et al. | 359/274 |
| 4,294,518 | 10/1981 | O'Connor et al. | 359/274 |
| 4,824,221 | 4/1989 | Endo et al. | 359/274 |
| 4,852,979 | 8/1989 | Agrawal | 359/274 |
| 5,134,175 | 7/1992 | Lucey | 522/76 |
| 5,151,816 | 9/1992 | Varaprasad et al. | 359/265 |
| 5,180,757 | 1/1993 | Lucey | 522/76 |
| 5,206,756 | 4/1993 | Cheshire | 359/270 |
| 5,231,531 | 7/1993 | Defendini et al. | 359/275 |
| 5,233,461 | 8/1993 | Dornan et al. | 359/265 |
| 5,282,077 | 1/1994 | Byker | 359/272 |
| 5,353,148 | 10/1994 | Eid et al. | 359/265 |
| 5,356,947 | 10/1994 | Ali et al. | 522/57 |

*Primary Examiner*—Loha Ben
*Attorney, Agent, or Firm*—Brian J. Rees

[57] ABSTRACT

A method of forming an optically transparent seal involves the steps of providing an uncured resinous material, adding a spacing media to the resinous material and curing the resinous material. The spacing media can have an index of refraction similar to that of the resinous or an antireflective coating provided thereon. A filler material can also be added to the resinous material.

21 Claims, 2 Drawing Sheets

METHOD OF FORMING OPTICALLY TRANSPARENT SEAL AND SEAL FORMED BY SAID METHOD

This application is a continuation of U.S. application Ser. No. 08/560,004, filed Nov. 17, 1995, now abandoned, which is a continuation-in-part of U.S. application Ser. No. 08/237,604, filed May 3, 1994, now abandoned.

FIELD OF THE INVENTION

The present invention relates to electrochromic devices which have reversibly variable transmittance to electromagnetic radiation. More particularly, the present invention is directed to an electrochromic mirror which uses a transparent seal for confining an electrochromic media between a pair of electrodes to expand the field of view of the mirror and a process of making the electrochromic mirror.

BACKGROUND OF THE INVENTION

Electrochromic devices are typically made up of at least a pair of electrodes and an electrochromic media provided between the electrodes. The electrochromic media undergoes a transmission change or changes from clear to dark or dark to clear when a potential difference is applied across the electrochromic media between the electrodes. Electrochromic devices have recently gained great popularity as sideview and rearview mirrors in vehicles, particularly automotive vehicles.

When used in rearview and sideview mirror assemblies in automobiles, the electrochromic devices are typically connected to a sensor circuit for sensing ambient levels and light levels reflected to the drivers eye. Depending on the intensity and ratios of the ambient and reflected light, a voltage potential is applied to the electrodes and across the electrochromic media in order to make the electrochromic media undergo a transmission change so that only light of acceptable intensity is reflected to the driver regardless of the intensity of the glare-causing light incident on the mirror from the rear.

In order to confine the electrochromic media between the electrodes, a seal is provided between the electrodes which surrounds the electrochromic media. In addition to confining the electrochromic media, which often contains strong organic solvents or corrosive components, the seal must be able to survive the rigors of interior and exterior automotive environments while simultaneously protecting the electrochromic media from oxygen and/or moisture poisoning.

Conventional seals used in electrochromic devices making up automotive mirror assemblies have typically been opaque and subtract from the total amount of available reflective surface. A conventional interior rearview mirror assembly having an electrochromic mirror assembly with a perimeter seal is illustrated in FIG. 1. The interior rearview mirror 20 of FIG. 1 comprises a molded plastic housing or case 22, typically injection molded from a resinous plastic material such as polypropylene, polycarbonate, ABS, nylon or the like, having a retaining rim or bezel 24 which surrounds and encircles the electro-optic mirror assembly A and retains it within case 12.

The electro-optic mirror assembly A includes a seal 26, two transparent electrode-bearing planar members 27, 28 and electrical contact clips 30 in contact with the transparent electrodes. Due to the presence of clips 30, the planar members 27, 28 are staggered or "offset" from each other. In typical prior art approaches, the sealing methods subtract from the available reflective surface of the mirror. Other methods that do not subtract from the reflective surface have involved applying a vacuum deposited coating that is reflective in front of the seal on either the front or rear surface of the first transparent planar member 28 in FIG. 1. For outside motor vehicle mirrors, a minimum amount of reflective area must be provided for the mirrors in order to satisfy the field of view requirements of the U.S. Federal Motor Vehicle or other standards. The reflective area must also have a reflectivity greater than 35% for domestic use and greater than 30% for foreign use. Since the field of view is reduced by about 2% for every 1 mm of shrinkage in overall dimensions, it is desirable to have as large of a reflective area as possible in order to keep the overall mirror assembly as small as possible.

A conventional laminate electrochromic mirror assembly using a reflective surface in front of the seal is illustrated in FIG. 2. Electro-optic mirror assembly 510 is of laminate construction and includes a front glass substrate element or panel 512 which may be scatter and anti-lacerative protected and ultraviolet radiation stabilized. Element 512 is preferably formed from an elongated, generally planar sheet of conventional soda lime window glass, as is the second glass substrate element 514. Second element 514 is preferably similar in shape and size to and spaced slightly rearwardly from front element 512 to define a gap or space 516 for receiving an electro-optic medium 518. Space 516 is formed between the generally parallel rear facing surface 513 of the front or first glass element 512 and the forward facing surface 515 of rear or second glass substrate element 514. At least one surface, preferably surface 513, or both the front and rear facing surfaces 513 and 515, include a layer or coating 513a, 515a of a transparent, electrically conductive material such as indium tin oxide (ITO) or fluorine-doped tin oxide (TO) which enables application of an electric field or voltage across space 516 between ITO layers 513a, 515a. A reflective layer that is also conductive, such as chrome, rhodium, stainless steel or the like, and combinations thereof, can be substituted for the transparent conductive layer on surface 515.

Typically, when layer 515 is a transparent conductive coating such as ITO, the rear surface of rear glass element 514 is coated with a reflective layer 612, preferably of metallic material such as aluminum, or a combination of a silver, copper and protective paint layer, as is conventionally known. A multi-layer dichroic reflector can also be used either under the transparent conductive layer 515a or in place of the reflective layer 612. In order to confine and retain the electro-optic medium 518 in gap 516, a peripheral seal 616, formed from a material which adheres well to the coatings 513a, 515a on glass surfaces 513, 515 is applied adjacent the peripheral edges of the glass elements 512, 514. The rear facing surface 513 of ITO coated front glass element 512 is coated with a perimeter coating layer 618 of reflective metallic material such as aluminum, chrome, stainless steel, rhodium, silver/copper or equivalent to add to the reflective area and increase the field of view. The use of a reflective coating to cover the perimeter seal area requires the precise masking of each individual cut substrate, a cleaning process, a vacuum deposition process and the subsequent removal of the masking layer. Additionally, if a reflective material is selectively deposited on a second surface to cover the perimeter seal area, it would not be on the same plane as the continuous third or fourth surface reflector and a parallax distortion will occur in a reflected image.

Typically, electrochromic devices are constructed such that the surfaces bearing the electrode layers are offset from each other in order to accommodate electrical contact busses or clips at perimeter surfaces thereof. The amount these electrodes are offset from each other effectively reduces the field of view of the device's reflective surface and necessitates an increase in the device's size in order to obtain a maximum field of view.

The narrowing of the perimeter seal to increase the field of view is not a desirable option as the effective life of the electrochromic element is dependent on the width of the perimeter seal. Therefore, there is a need to provide an electrochromic device containing a seal which has an expanded field of view and avoids all of the above-discussed problems. The present invention was conceived in recognition of and solution to these problems.

SUMMARY OF THE INVENTION

The present invention is directed to an electrochromic mirror in which an electrochromic media is confined between a pair of electrodes by an optically transparent perimeter seal, i.e. a seal having a light transmittance of at least 50%. The optically transparent perimeter seal may contain a filler material which does not adversely affect the optical transparency of the resinous material making up the seal or no filler material at all. The optically transparent perimeter seal may also contain UV stabilizers or absorbers used to prevent or retard degradation due to ultraviolet light exposure.

In the electrochromic mirror of the present invention, the perimeter seal, when the mirror is in the bleached or undarkened state, is not visible to the casual observer, even though it is not behind a bezel or a reflective layer, as such, when used in a mirror assembly, the reflective layer on either the third or fourth surface will be visible through the seal and appear as a continuous unbroken reflective film which is free from parallax distortion during day time driving conditions. During night time driving conditions the vast majority of the mirror surface still darkens to relieve glare.

The present invention is also directed to an electrochromic mirror having a transparent seal and minimum or zero offset between the surfaces bearing the electrode layers. The combination of a transparent seal and minimum or zero offset between the electrode-bearing surfaces results in a maximum field of view for the electrochromic mirror with a minimum size and enables the most efficient and effective use of the reflective surface of the mirror.

Electrochromic systems are usually formulated to be transparent or reflective in one state, pass through a state of varying transmission or reflection, and be very low in transmission or reflection in another. Since many electrochromic systems are not completely colorless in the bleached or transmissive state, the seal may be tinted with a small amount of colorant in order to peripherally match the hue or slight coloration of the transparent electrochromic system. It may also be desirable to have the seal darkened to a shade intermediate to the fully lightened and fully darkened states of the electrochromic system for optimal aesthetic purposes or reduce the reflection in the seal area to just meet regulated minimums. Additionally, a small amount of complimentary colorant can be added to the electrochromic system so that it may absorb all light uniformly and appear non-colored. This is especially beneficial in mirror applications where imparting a hue or color tint to the reflected or transmitted image is undesirable. Or a colorant such as a blue dye or pigment could be added to both the electrochromic system and the seal to tint or color the reflected image. This is especially beneficial when matching the color of blue tint mirrors popular on European vehicles.

If the reflective layer 17 is removed from the electrochromic mirror device in FIG. 4, the device becomes an electrochromic window with variable transmittance rather than variable reflectance.

When used in general electrochromic window applications, the transparent seal can be used as pillars or to create compartments throughout the window to control the electrochromic layer spacing and minimize the effects of hydrostatic pressure. The internal transparent pillars or seal areas would not be visible in a non-darkened window. When darkened, the total area of the window covered by the transparent pillar or seal would be minimal and not interfere with the desired darkened electrochromic effect.

In addition to mirrors and windows, the present invention is also directed to the use of a transparent perimeter seal for electrochromic eyeglass lenses. The seal would not be visible in the lens undarkened state and the seal area could be used as part of the lens area. The vast majority of the lens area would still be available to darken in bright ambient light to relieve eyestrain.

DETAILED DESCRIPTION OF THE INVENTION

Figure 1:
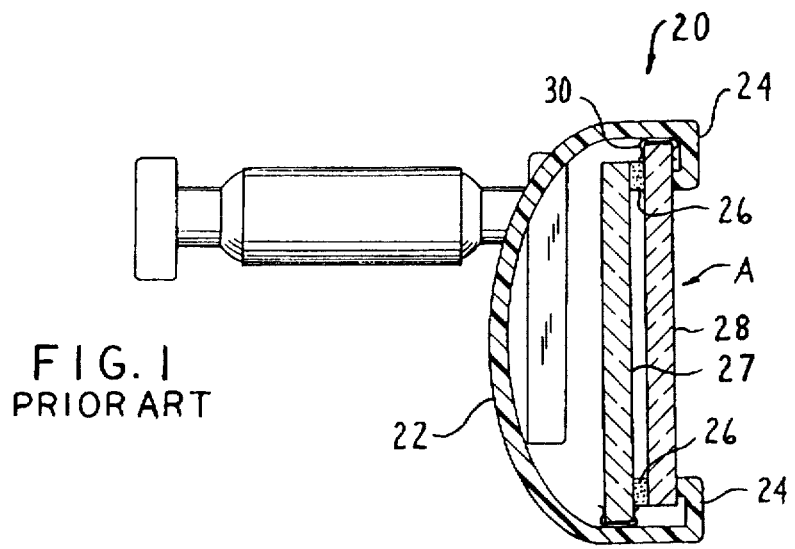
FIG. 1 is a schematic side elevation shown partially in section of a prior art interior rearview mirror assembly having an electro-optic mirror assembly with a perimeter seal.
Figure 2:
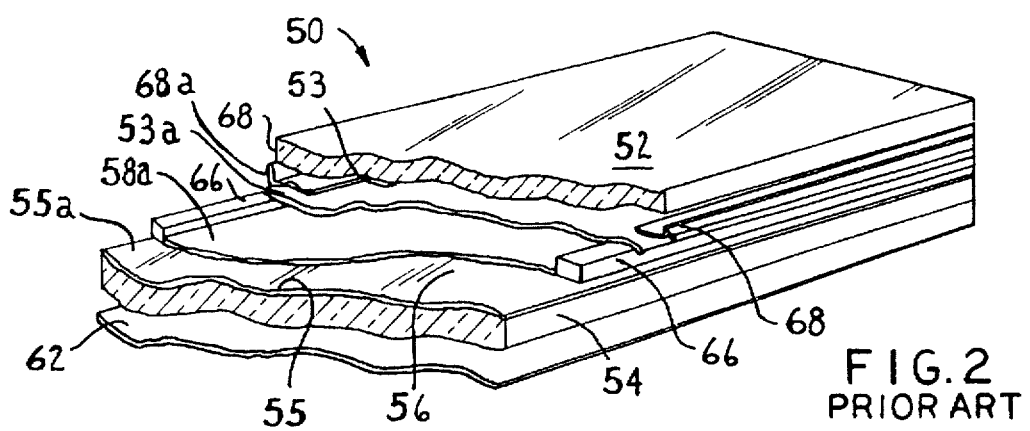
FIG. 2 is a fragmentary, perspective view of a prior art laminate electro-optic mirror assembly.
Figure 3:
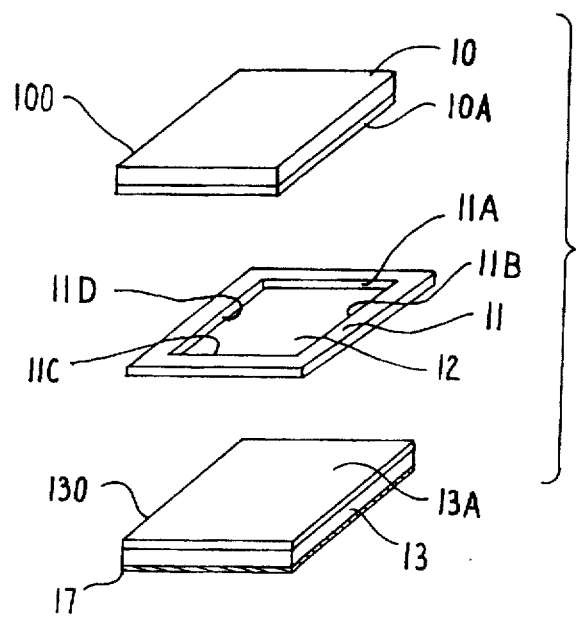
FIG. 3 is an exploded view of an electrochromic mirror of the present invention.

FIG. 3 illustrates an electrochromic mirror of the present invention. The basic components making up the mirror of the present invention comprise two electrode-bearing sides or walls, 100 and 130, a perimeter seal, 11, which spaces apart and holds together the walls 100 and 130 in an assembled device, and surrounds a space or volume 12 and a reflective layer 17 provided on the bottom surface of wall 130. The volume 12 is defined by, in an assembled device, electrode layers, 10A and 13A, on the electrode-bearing walls 100 and 130, respectively, and inner wall surfaces 11A, 11B, 11C and 11D of seal 11. The details and the operation of the individual components of the electrochromic device and the electrochromic device as a whole is shown in U.S. Pat. No. 4,902,108 and U.S. patent application No. 08/278 913, filed Jul. 22, 1994, which are expressly incorporated by reference herein.

Figure 4:
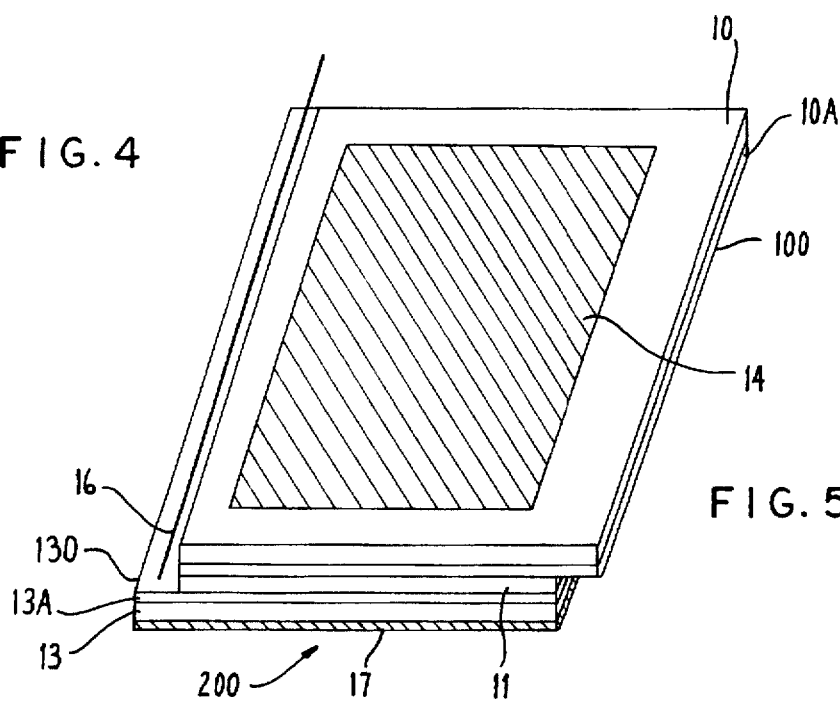
FIG. 4 discloses an assembled electrochromic mirror of the present invention with the electrode layers offset from each other.

FIG. 4 illustrates an electrochromic mirror assembly 200 of the present invention in which electrode layers 10A and 13A are offset from each other in order to allow a conductor 16 to make contact with electrode layer 13A. Cross-hatched area 14 illustrates the portion of planar, transparent wall 100 which overlays the electrochromic solution. A similar conductor (not shown) is also brought into contact with electrode layer 10A so that a voltage potential can be applied across the electrode layers 10A and 13A and the electrochromic material contained between the electrode layers.

Due to the presence of the transparent seal 11, an increased field of view of the reflector layer 17 is achieved.

Figure 5:
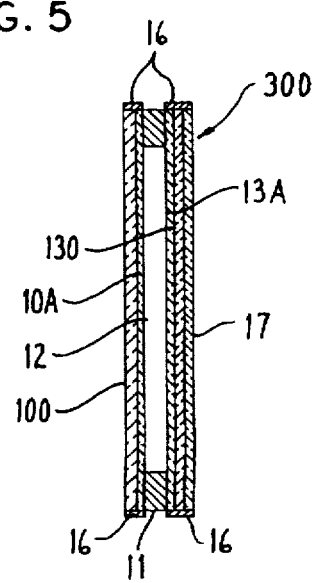
FIG. 5 is a view illustrating an assembled electrochromic mirror of the present invention with zero offset between the electrode-bearing surfaces.

In FIG. 5, a full field of view electrochromic mirror assembly 300 of the present invention is shown. In this embodiment, the sides of the electrode-bearing walls 100 and 130 are parallel and in alignment with each other. Transparent electrode layers 10A and 13A are provided on inner surfaces of walls 100 and 130 and together with transparent seal 11 define a volume 12 in which the electrochromic media is contained. A reflective layer 17 is deposited on the outer surface of wall 130 and conductors 16 are provided on top and bottom edges of walls 100 and 130 and are in contact with electrode layers 10A and 13A. External electrical contact to the electrode layers 10A and 13A is made through edge layers 16. The transparent seal 11 allows the entire reflective surface of reflective layer 17, or 13A if 13A is a reflective electrode layer, to be utilized to afford a full field of view for the mirror assembly 300.

The material making up the transparent seal 11 of the present invention is typically a resinous material which is transparent when cured, such as an acrylate, polyisobutylene or epoxy resin, with epoxy resins being preferred in environments where corrosive conditions exist, and multifunctional epoxy resins being especially preferred.

In order to control the spacing between the electrode elements, a spacing media can be blended into the seal. The spacing media is typically glass, plastic rods or beads, and if this spacing media is of a small size, transparent and free of entrapped air or voids, it generally is not visible to the casual viewer and can be used in the present invention. However, in critical applications, it is necessary that the spacing media be made near invisible by using a spacing media having an index of refraction that closely matches the index of refraction of the seal material. Alternatively, an anti-reflective coating can also be provided on the spacing media. As the purpose of the spacing media is to control the distance between the electrodes, the particle size of the spacing media is based on the final desired gap between the electrodes and for most applications, the particle size of the spacing media is small enough to not adversely affect the optical transparency of the seal. In typical vehicular applications, the spacing media have a particle size of from about 100–250 µm and a loading that is less than one weight percent. As long as the spacing media is transparent, it generally does not cause any problems of light scattering, and index matching of the spacing media to the seal material becomes unnecessary.

To maintain the seal material in place during assembly and curing steps, it may be necessary to control the rheology of the seal material by adding fillers or other materials which will give the sealant body and/or thixotropy. The amount of the filler contained in the resin media depends on various factors. The purpose of the filler is to hold the resin media in place while the seal is cured. The upper limit of the filler content in the present invention is the critical pigment volume concentration, i.e. where the filler loading is so high that there is no longer enough resin to fill the space between filler particles and voids develop. Depending on cure conditions, the filler loading can be as low as 0 weight percent or as high as the critical pigment volume concentration and still produce an acceptable clear seal with good shape and edge definition. As far as the size range of the filler particles, the only limit imposed is that of the desired final spacing between the two electrodes in the electrochromic device. The filler particles must be smaller in size than the desired gap between the electrodes.

If the seal is cured without heating the resin, such as with ultraviolet radiation, or over a period of time at room temperature, it may not be necessary to add a filler to hold the resin in place while it cures. A UV cured acrylate seal can be prepared by providing a low viscosity clear acrylate resin composition not having a heavy filler load and curing the resin composition by UV radiation to produce a water white transparent seal. A UV cured epoxy seal is likewise provided by UV curing an unfilled epoxy resin to cause cationic polymerization. Although the seal changes from being clear to light brown after being exposed to the UV radiation, with some UV curing agents, the seal can be "uncolored" by conducting a post bake at 150° C. for a short period of time. UV cured seals typically exhibit only fair environmental performance.

UV curing can be combined with thermal curing to provide a seal which exhibits fairly good environmental performance. In this type of curing, an unfilled or lightly filled resin composition is first cured by UV radiation just enough so that the resin composition thickens and does not flow uncontrollably when heated during the subsequent thermal cure. The partially cured resin composition is then thermally cured to completely cure the resin composition.

Additionally, for sealants containing a small amount of filler or not containing a filler at all, a two-step ramped thermal process can be used in which the seals are cured at a low temperature for a period of time necessary to thicken the seal blend, while still maintaining good seal edge definition, and then an elevated temperature bake is used to complete the cure of the sealant material. Generally with most resins, if an elevated temperature cure is used alone, the seal material will liquify and flow uncontrollably prior to curing. A two-step thermal cure is necessary for this type of seal material and also when some unfilled or lightly filled resins are used. A two-step thermal cure process is not needed when a filler such as silica, fumed silica, calcium carbonate, clay or an equivalent, is added to the seal mixture to hold the liquid seal in place at an elevated temperature until it completely cures. A one-step cure process is preferable because it enables short and simple cure cycles which allow high production rates. If the optical transparency of the filled seal is to be maintained, filler materials having special properties are required.

In the present invention, conventional filler material either having an index of refraction that closely matches the seal material, or is of a finely dispersed particle size that is small and does not excessively scatter visible light, such as less than 20 nanometers, or both, can be used. Typical fillers used in conventional electrochromic devices not having the above-discussed properties are not acceptable in the present invention as they are discernable in the seal because they either are not transparent and absorb light, do not match the refractive index of the resin and are large enough to scatter light, or both. A preferred filler material for the transparent seal of the present invention is cured particles of the resinous material that constitute the seal itself or a solid resin with similar optical characteristics. These cured or solid particles have an index of refraction which is identical or very similar to that of the seal material and therefore are not discernible in the seal. Another filler material which is especially suitable for the present invention is fumed silica having its surface modified with a silane or silicone oil, such as Aerosil R-812 or US-206 by DeGussa. An untreated fumed silica with a very small particle size such as Aerosil 300 (7 nanometers) can also be used. Fumed silica typically forms agglomerates of primary fumed silica particles. In the present invention, the fumed silica primary particles desirably have a particle size of less than 50 nanometers. More preferably, the fumed silica primary particles have a particle size of less than 20 nanometers. The surface modification of the fumed silica such as with R-812 gives it a refractive index of approximately 1.52 which, together with its small average primary particle size of 7 nanometers, makes it particularly preferred in epoxy resin systems.

EXAMPLES

Example 1

One step UV cure, UV cured acrylate seal

A transparent seal was prepared for a mirror element using Dymax X-195-68-1 UV curable adhesive, an acrylate, as a perimeter seal. The Dymax adhesive, containing 1.5 wt. percent 125 µm glass beads spacers was UV cured using a Dymax PC-2 light source. With the exception of the contact ledge offset, the electrochromic mirror looked surprisingly like a standard rear view mirror. When the electrochromic mirror was placed behind a rim/bezel, the clear transparent seal was not visible at any viewing angle and the mirror appeared as one continuous reflector.

Example 2

One step UV cure, UV cured epoxy seal 200 grams of a multifunctional epoxy novolac resin (D.E.N. 431 by Dow Chemical Corporation) was preheated to 80° C. and mixed with 8.3 grams of a curing agent (Cyracure UVI 6990 by Union Carbide), 2.0 g of a silane (A-187 by Union Carbide) and 2.0 grams of 137 µm glass beads in a planetary mixer to prepare a seal material. A mirror element made with this seal material was UV-cured. After curing, the seals darkened in color. After heating the mirror element at 150° C. for 10 minutes, the color was removed from the seal to yield a transparent seal suitable for use in the present invention.

Example 3

Two step cure, epoxy resin 40.8 grams of a multifunctional epoxy novolac resin (D.E.N. 431 by Dow Chemical Corporation), 40.8 grams of a standard epoxy resin (Epon 828 by Shell Chemical), 14.4 grams of a multifunctional acrylic resin (Epecryl 3603 by Radcure Specialties), 4.0 grams of a curing agent (Cyracure UVI 6990 by Union Carbide), 4.0 grams of 2-ethyl, 4-methyl-imidazole, 0.54 grams of a silane (A-1120 by Union Carbide) and 0.5 grams of 137 µm glass beads were mixed under a vacuum in a planetary mixer. A mirror element was made using this formulation as a seal material. The seal was partially cured by being exposed to UV light for 60 seconds and then thermally cured by heating the mirror element at 150° C. for 10 minutes. The seal had a light yellow hue, which is typical of imidazole cured epoxy systems, but still was transparent and exhibited fairly good environment resistance.

Example 4

Two step thermal cure, epoxy resin 20 grams of a multifunctional epoxy novolac resin (D.E.N. 431 by Dow Chemical Corporation), 6.08 grams of bis-p-aminocyclohexyl methane, 0.010 grams of a silane (A-1120 by Union Carbide) and 0.28 grams of 137 µm glass beads were thoroughly mixed by hand with care being taken to avoid air entrapment. A mirror element was made using this formulation as a seal. The mirror element was cured at 80° C. for 40 minutes and then at 150° C. for 10 minutes. The cured seal was colorless and contained no haze. This seal exhibited excellent environmental resistance.

Example 5

One step thermal cure, epoxy resin 430 grams of a multifunctional epoxy novolac resin (D.E.N. 431 by Dow Chemical Corporation) and 43 grams of surface-modified fumed silica (R-812 by DeGussa) were vacuum mixed in a planetary mixer to prepare mixture A.

180 grams of an aliphatic amine curing agent (Ancamine 2049 by Air Products and Chemicals) and 30 grams of surface-modified fumed silica (R-812 by DeGussa) were vacuum mixed in a planetary mixer to form mixture B.

100 parts by weight of mixture A, 40 parts by weight of mixture B, 0.5 part by weight of a silane (A-1120 by Union Carbide) and 1 part by weight of 137 µm glass beads were vacuum mixed in a planetary mixer. A mirror element was prepared using this formulation as a seal material. The mirror element was heated at 150° C. for 10 minutes in order to cure the seal. The seal had no color, a low haze and exhibited good environmental resistance.

Example 6

Minimum Offset Electrochromic Mirror With Full Field of View

An electrochromic element was made out of two pieces of single strength glass that were cut to a typical outside mirror shape measuring approximately 3.75" in height and 6.0" in width with rounded corners. The front piece of glass had a transparent conductive coating of indium tin oxide (ITO) with a sheet resistance of approximately 15 ohms per square on the back surface (surface two) and the rear piece of glass had a similar ITO coating on the front surface (surface three) and a silver reflective coating with a protective paint overcoat on the rear surface (surface four). A transparent seal material containing −130 micron glass bead spacers was applied around the perimeter of one glass substrate such that a small gap in the seal remained for subsequent filling with electrochromic material. The two substrates were then assembled together and fixtured such that the edges of the two glass substrates were in line with each other with minimal offset and the transparent seal was recessed slightly from the glass edges.

The transparent seal formulation was as follows; a multifunctional epoxy novolac resin (DEN-431 by Dow Chemical) 25.0 g, para amino cyclohexyl methane (Pacific Anchor) 7.6 g, amino silane coupling agent (Dow Corning DC-2-6020) UV cure adhesive (Dymax Corp.), 4.9 g, glass beads (Duke Scientific) 0.09 g. The seal was exposed to UV light to thicken or gel the seal and then it was heat cured at 110 degrees centigrade for 6 minutes. The top and bottom edges of the glass sandwich were then sand blasted to frost the edges. The edges were cleaned with water and then alcohol. A layer of chrome metal and then about 4,000 nm of copper metal was vacuum sputtered onto both the top and bottom glass edges. The metal was applied with the substrate at a slight angle relative to the metal sputtering targets such that the majority of the metal was deposited onto the glass edges and only a small amount of metal wrapped around the glass edge to make electrical contact to the transparent ITO electrode layers. The assembly was then vacuum filled through the gap in the seal with electrochromic material and the seal gap was then plugged with a UV curable sealant. Wires were soldered to the copper layers on the edges of the glass substrates to make an electrical connection to the transparent ITO electrodes.

The electrochromic mirror assembly is illustrated in FIG. 5 and had no or minimal offset and a continuous reflective surface from edge to edge in the unbleached state which closely resembled a standard first surface chrome outside mirror in appearance and, more importantly, field of view. When 1.2VDC was applied to the mirror assembly through attached wires the vast majority of the mirror surface went from a high reflectivity of greater than 70% to a low reflectivity of less than 10%.

The embodiments of the invention in which an exclusive property or privilege is claimed are defined as follows:

1. An electrochromic mirror system comprising:

a mirror assembly containing a first transparent element and a second element spaced apart from said first transparent element, the side of said first transparent element confronting said second element having a layer of a transparent conductive material disposed thereon, and the side of said second element confronting said first element having a layer selected from the group consisting of a transparent conductive material and a reflective material disposed thereon, where, when said first element-confronting side is coated with said transparent conductive material, the side of said second element not confronting said first element has a layer of reflective material disposed thereon;

an electrochromic media provided between said first and said second elements;

a transparent seal having an optical transmission of over 50% surrounding and confining said electrochromic media between said first and said second elements; and where at least a portion of said seal is included in a visible reflective area of said mirror assembly, thereby increasing the field of view of said mirror system.

2. The electrochromic mirror system of claim 1, further comprising a housing for containing said mirror assembly, said housing having an opening adapted to receive said mirror assembly.

3. The electrochromic mirror system of claim 2, where said housing further comprises a bezel provided around said opening for retaining said mirror assembly within said housing, said bezel being of sufficient width to engage said first transparent element.

4. The electrochromic mirror system of claim 1, where visible light traveling through said first transparent element and said transparent seal, reflecting off said reflective layer on said second element, and exiting through said seal and said first element, has a reflectivity of at least 30%.

5. The electrochromic mirror system of claim 1, where said transparent seal comprises a resin selected from the group consisting of an acrylate, a polyisobutylene, and an epoxy.

6. The electrochromic mirror system of claim 5, where said transparent seal includes a filler selected form the group consisting of treated and untreated fumed silica and cured particles of said resin.

7. The electrochromic mirror system of claim 6, where said seal is an epoxy resin and where said filler has approximately the same refractive index as said epoxy resin.

8. The electrochromic mirror system of claim 1, where said seal is tinted.

9. The electrochromic mirror system of claim 1, where said seal comprises spacers having approximately the same refractive index as said seal.

10. The electrochromic mirror system of claim 1, where said seal comprises spacers that are coated with an anti-reflective coating.

11. The electrochromic mirror system of claim 1, where said reflective layer also extends onto at least a portion of the edge of said second element.

12. The electrochromic mirror system of claim 11, where said reflective-layer coated edge allows said first and second elements to have zero offset from each other.

13. An electrochromic mirror system comprising:

a mirror assembly containing a first transparent element and a second element spaced apart from said first transparent element, the side of said first transparent element confronting said second element having a layer of a transparent conductive material disposed thereon, and the side of said second element confronting said first element having a layer selected from the group consisting of a transparent conductive material and a reflective material disposed thereon, where, when said first element-confronting side is coated with said transparent conductive material, the side of said second element not confronting said first element has a layer of reflective material disposed thereon;

an electrochromic media provided between said first and said second elements;

a transparent seal having an optical transmission of over 50% surrounding and confining said electrochromic media between said first and said second elements; and a layer of a conductive material provided on at least a portion of the edges of said first and second elements and electrically connected to said layers on the sides of said first and second elements confronting one another;

where at least a portion of said seal is included in a visible reflective area of said mirror assembly, thereby increasing the field of view of said mirror system, and where said first and second elements are assembled with zero offset.

14. The electrochromic mirror system of claim 13, further comprising a housing for containing said mirror assembly, said housing having an opening adapted to receive said mirror assembly.

15. The electrochromic mirror system of claim 13, where visible light traveling through said first transparent element and said transparent seal, reflecting off said reflective layer on said second element, and exiting through said seal and said first element, has a reflectivity of at least 30%.

16. The electrochromic mirror system of claim 13, where said transparent seal comprises a resin selected from the group consisting of an acrylate, a polyisobutylene, and an epoxy.

17. The electrochromic mirror system of claim 16, where said transparent seal includes a filler selected form the group consisting of treated and untreated fumed silica and cured particles of said resin.

18. The electrochromic mirror system of claim 17, where said seal is an epoxy resin and where said filler has approximately the same refractive index as said epoxy resin.

19. The electrochromic mirror system of claim 13, where said seal is tinted.

20. The electrochromic mirror system of claim 13, where said seal comprises spacers having approximately the same refractive index as said seal.

21. The electrochromic mirror system of claim 13, where said seal comprises spacers that are coated with an anti-reflective coating.

* * * * *